United States Patent [19]

Mouillé et al.

[11] Patent Number: 4,521,390
[45] Date of Patent: Jun. 4, 1985

[54] CONTINUOUS PROCESS AND EQUIPMENT FOR THE RECOVERY OF NITROGEN OXIDES FROM NITROUS GASES

[75] Inventors: Bernhard Mouillé, Pievefitte; Michel Durand, Angeles Gazon, both of France

[73] Assignee: Compagnie Francaise de l'Azote Cofaz, Paris, France

[21] Appl. No.: 434,104

[22] Filed: Oct. 13, 1982

Related U.S. Application Data

[63] Continuation of Ser. No. 158,142, Jun. 10, 1980, abandoned.

[30] Foreign Application Priority Data

Jun. 13, 1979 [FR] France .................. 79 15147

[51] Int. Cl.³ ............................................. C01B 21/40
[52] U.S. Cl. .................................... 423/239; 423/393
[58] Field of Search .............. 423/235, 239, 393, 400

[56] References Cited

U.S. PATENT DOCUMENTS

| 1,433,969 | 10/1922 | Noyes et al. | |
| 2,856,259 | 10/1958 | Bollinger | 423/393 |
| 2,992,895 | 7/1961 | Feustel et al. | 423/239 |
| 3,472,620 | 10/1969 | Riga | 423/393 |
| 3,710,548 | 1/1973 | Coughlin | 423/239 |
| 3,960,507 | 6/1976 | Tsujikawa et al. | 23/288 K |
| 4,219,536 | 8/1980 | Hoenke | 423/393 |

FOREIGN PATENT DOCUMENTS 961240 1/1975 Canada .
1502724 11/1967 France .
2211278 7/1974 France .

OTHER PUBLICATIONS

Chemical Abstracts, vol. 81, Dec. 16, 1974, abstract 158222f, p. 332.
Synopsis of Japanese Patent Laid-Open No. 90680/74.
Synopsis of Japanese Patent Laid-Open No. 94478/76.

Primary Examiner—John Doll
Assistant Examiner—Wayne A. Langel
Attorney, Agent, or Firm—Fleit, Jacobson, Cohn & Price

[57] ABSTRACT

This invention relates to a continuous process for the recovery of nitrogen oxides from a gaseous mixture containing, with other chemicals, said nitrogen oxides and in general some oxygen. This process is characterized by the fact that this gaseous mixture flows simultaneously with an aqueous liquid which may be pure water or an aqueous nitric acid solution over a carbonaceous adsorbing layer which may be made of activated carbon.

11 Claims, 1 Drawing Figure

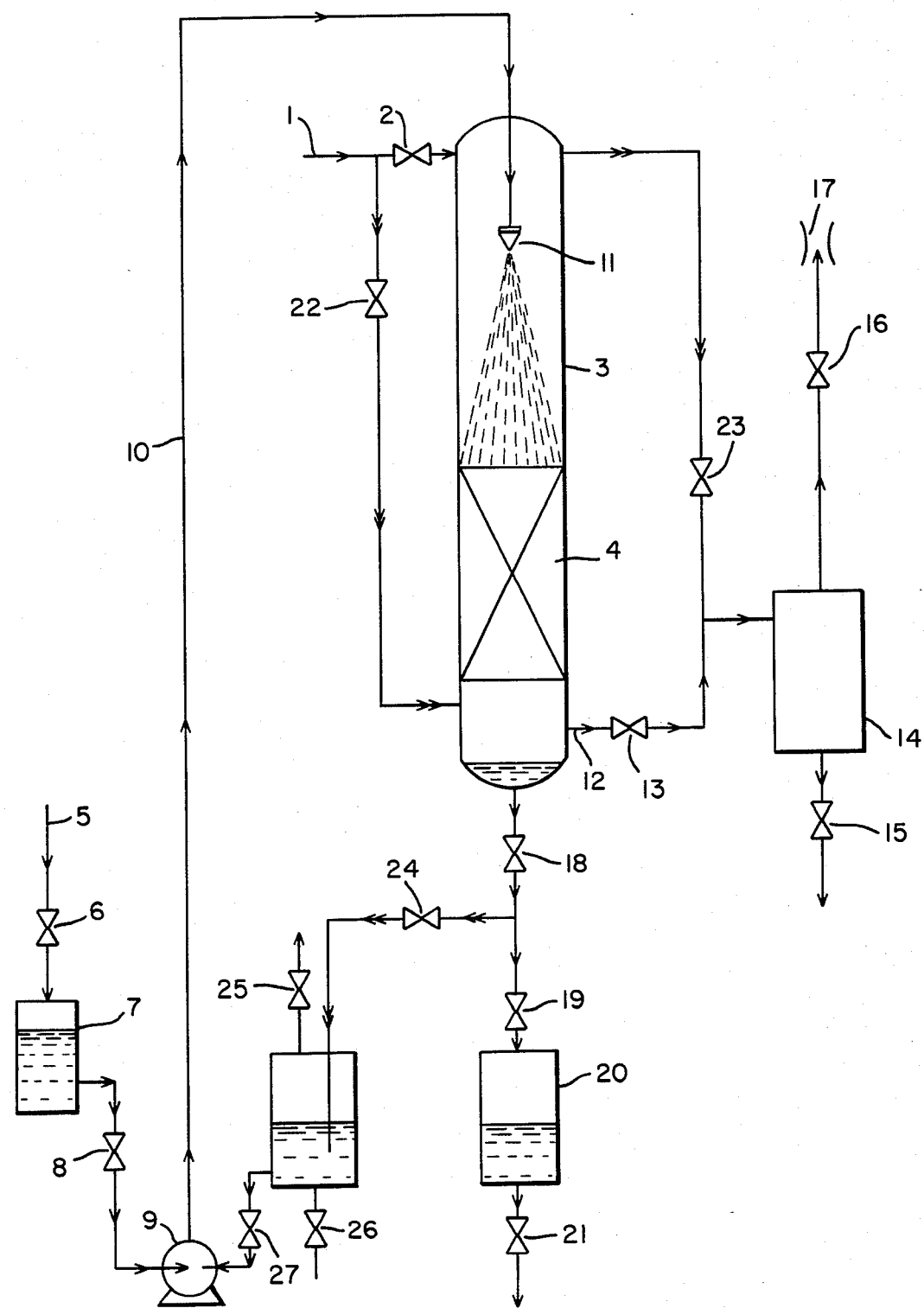

CONTINUOUS PROCESS AND EQUIPMENT FOR THE RECOVERY OF NITROGEN OXIDES FROM NITROUS GASES

This is a continuation of application Ser. No. 158,142, filed 6/10/1980, now abandoned.

This invention relates to a continuous process for the recovery of nitrogen oxides permitting among others the partial removal and the discoloration of gaseous atmospheric off-gases usually named nitrous gases; it relates also to the equipment required to operate the process.

Tail-gases of nitric acid units contain nitric oxides: nitric oxide NO (colourless) and nitrogen dioxide $NO_2$ (brown-red); furthermore upon contact with atmospheric air, nitric oxide NO is slowly oxidized into nitrogen dioxide $NO_2$. Nitrogen oxides such as NO and $NO_2$ are usually referred to as $NO_x$.

These oxides are not only emitted by nitric acid units but also by units producing calcium nitrate or nitrated organic chemicals, power plants, industrial boilers, pickling units or automobile motors.

Various processes were offered that could eliminate nitrogen oxides:

scrubbing gaseous effluents with alkaline solutions such as sulfites;

catalytic reaction with ammonia or other reducing agents such as hydrogen or methane;

normal (dry) adsorption of nitrogen oxides by adsorbing materials such as molecular sieves or activated carbon. Adsorbents are subsequently regenerated by thermal desorption with a gas flow followed by cooling in order to restore an active adsorbent.

The thermal desorption will produce a rather quick wear of the adsorbent. Furthermore such process requires several drums containing the adsorbent, and also a heating equipment and the piping to obtain the cycle adsorption-regeneration. This means a large capital cost and high operating costs even excluding the cost resulting from frequent changes of adsorbent.

We found, and this is the invention, that a satisfactory elimination of nitrogen oxides was obtained economically by a process which consists in having the gaseous stream containing nitrogen oxides in contact with a carbonaceous adsorbent such as activated carbon sprayed simultaneously with water or with an aqueous solution of nitric acid at variable concentration.

In these conditions a notable elimination of nitrogen oxides was obtained, without degradation of the activated carbon and without auxiliary fluid or equipment.

The mechanism of the nitrogen oxides elimination can be explained as follows:

In contact with activated carbon, the nitric oxide NO is adsorbed and reacts with oxygen $O_2$ which is normally at hand (in case of nitric acid units, the oxygen content is usually 1 to 6% in volume in tail-gases) nitrogen dioxide $NO_2$ is formed by

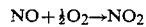

All the adsorbed nitrogen dioxide (original $NO_2$ and formed $NO_2$) reacts with water to produce nitric acid and nitric oxide by

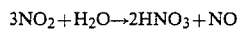

The nitric acid is entrained by water and recovered in the unit; nitric oxide which is almost insoluble in water (or in weak acid) is removed with the gaseous effluent.

In case of complete lack of oxygen, the nitric oxide NO is unchanged and only the existing nitrogen dioxide $NO_2$ can be eliminated; but oxygen can be added as air required to remove all nitric acid NO.

This process is thus capable or removing more than half the nitrogen oxides with the following features:

almost complete elimination of nitrogen dioxide $NO_2$ yielding colourless effluents; traces of nitrogen dioxide approximately 50 vpm (volumes per million of volumes) can remain;

elimination of more than half nitrogen oxides $NO_x$; the fact that gas scrubbing with water produces nitric oxide NO cannot generate a complete elimination of nitrogen oxides $NO_x$;

recovery of nitric acid, which increases the overall efficiency of the unit by approximately 0.5%.

The abatement efficiency is increased with higher pressure, lower spatial velocity, higher oxidation ratio ($\tau = NO_2/NO_x$) and with the fact that spatial velocity of sprayed liquid is approximately 0.3 $h^{-1}$ (by spatial velocity we mean the ratio volume of fluid in a definite period of time, say one hour, to actual volume of adsorbing layer).

This process does not allow a total elimination of nitrogen oxides but involves more specifically the nitrogen dioxide (which causes the colour of the effluent) which is almost completely eliminated. This process shows the major advantage to use only one container, because it is continuous and does not require any auxiliary fluid because the liquid which is sprayed may be the make-up water of the nitric acid unit. The capital cost is therefore limited, the operating cost is reduced and the net result is an increase in the plant efficiency. A sufficiently clean liquid (water or acid) should be available, since solid material in a muddy water, for example, could plug partially the pores of the activated carbon and would reduce the abatement yield.

The invention will be better understood using the description that follows which refers to the Figure as an example, where said sole FIGURE, shows a preferred type of design for a unit based on the invention. The gas to be cleaned is fed in 1 and through valve 2 which is in open position, reaches the top of tower 3 and flows through the bed of activated carbon 4.

The water (or the weak acid) is fed in 5, then through valve 6 which is open, through drum 7, through valve 8 and through the pump 9 is transferred by piping 10 to the top of the tower 3 in which it is sprayed by nozzle 11 on activated carbon bed 4.

The gas which was cleaned is transferred by piping 12 and valve 13 into separator 14. The droplets of liquid which are recovered are purged through valve 15 and the gas is released to the atmosphere in 17 through valve 16.

The liquid, acid, is bled off at the bottom of the tower 3 through valve 18. It is recovered through valve 19 in drum 20 from which it can be purged through valve 21. During this operation, valves 22, 23, 24, 25, 26 and 27 are in closed position, since the unit operated at gas/liquid cocurrent downward and in open circuit for the liquid which is sprayed.

If the sprayed liquid is recycled, valves 19, 21 and 26 are in closed position, whereas valves 24, 25 and 27 are in open position.

The unit can also be operated at gas/liquid countercurrent, then valves 2 and 13 are in closed position whereas valves 22 and 23 are in open position; in this case again it is possible to operate the unit in open circuit or to recycle the sprayed liquid as mentioned previously.

It is also possible to enrich sprayed liquid by setting valves 8 and 19 in closed position and valves 24 and 27 in open position; sprayed liquid is recycled by pump 9 and pump 10, which allows its enrichment in nitric acid (for instance in the case of increasing the concentration of a weak nitric acid). When the concentration of nitric acid of this acid is large enough, it is possible to switch the operation to open circuit; it is possible, by setting the valves in the proper position, to recycle part of the enriched sprayed liquid and to feed water in quantity equivalent to bleed off nitric acid solution.

A so-called cross flow unit can also be operated, where the liquid flows downwards and the gas stream flows horizontally. The following examples indicate results obtained with this type of unit operated with activated carbon type "ACTICARBONE AC 35" of CECA S.A. This activated carbon has the shape of cylinders of the average following dimensions:
average diameter: 3.2 mm
average length: 3.9 mm The pilot unit for tests 1 through 6 includes a tower 1 meter high and 10 cm in diameter containing 3.3 dm³ of activated carbon weighing roughly 1.5 kg. The unit for tests 8 and 9 is a tower of 19.5 cm in diameter containing 21.8 dm³ of activated carbon weighing roughly 9.6 kg.

Analytical controls are based on a $NO_x$ analyser working by chemiluminescence supplying contents in $NO_x$, NO and $NO_2$.

EXAMPLE 1

Operating conditions are:
Cocurrent flow: nitrous gas and sprayed water flow downwards
Pressure: 2.4 bars abs
Temperature: 16° C.
Gas flow: 4.910 $Nm^3.h^{-1}$
Liquid flow: 0.7 $liter.h^{-1}$
Gas spatial velocity:
  actual: 670 $h^{-1}$
  at standard conditions: (0° C., 760 mm of mercury): 1.500 $h^{-1}$
Gas linear velocity: 0.08 $m.s^{-1}$
Water spatial velocity: 0.21 $h^{-1}$ After 11 days of continuous operation, the following results expressed in vpm (volumes per million of volumes) are obtained:

|  | inlet | outlet |
|---|---|---|
| $NO_x$ where | 1760 | 1010 |
| NO | 950 | 925 |
| $NO_2$ | 810 | 85 |
| $\tau = \frac{NO_2}{NO_x}$ | 0.460 | 0.084 |

Abatement efficiencies:
for $NO_2$: 89.5%
for $NO_x$: 42.6%

EXAMPLE 2

Operating conditions are:
Cocurrent flow downwards
Pressure: 2.4 bars abs
Temperature: 12° C.
Gas flow: 3.900 $Nm^3.h^{-1}$
Water flow: 1.2 $liter.h^{-1}$
Gas spatial velocity:
  actual: 520 $h^{-1}$
  at standard conditions: 1180 $h^{-1}$
Gas linear velocity: 0.06 $m.s^{-1}$
Water spatial velocity: 0.36 $h^{-1}$ After 37 days of continuous operation, the following results shown in vpm are obtained:

|  | inlet | outlet |
|---|---|---|
| $NO_x$ where | 1220 | 550 |
| NO | 660 | 500 |
| $NO_2$ | 560 | 50 |
| $\tau = \frac{NO_2}{NO_x}$ | 0.459 | 0.091 |

Abatement efficiencies:
for $NO_2$: 91.1%
for $NO_x$: 54.9%

EXAMPLE 3

Countercurrent flow (gas upwards, liquid downwards)
Pressure: 2.5 bars abs
Temperature: 15° C.
Gas flow: 3.880 $Nm^3.h^{-1}$
Water flow: 1.2 $liter.h^{-1}$
Gas spatial velocity:
  actual: 505 $h^{-1}$
  at standard conditions: 1175 $h^{-1}$
Gas linear velocity: 0.06 $m.s^{-1}$
Water spatial velocity: 0.36 $h^{-1}$ The following results shown in vpm are obtained:

|  | inlet | outlet |
|---|---|---|
| $NO_x$ where | 1410 | 705 |
| NO | 620 | 550 |
| $NO_2$ | 790 | 155 |
| $\tau = \frac{NO_2}{NO_x}$ | 0.560 | 0.220 |

Abatement efficiencies:
for $NO_2$: 80.4%
for $NO_x$: 50.0%

Countercurrent process is less efficient than cocurrent process. It causes a higher pressure drop, everything else being equal.

EXAMPLE 4

This case shows how important is the influence of the initial oxidation factor on the efficiency of the abatement for nitrogen dioxide $NO_2$.

Operating conditions are:
Cocurrent flow downwards
Pressure: 2.3 bars abs
Temperature: 12° C.
Gas flow: 3.650 $Nm^3.h^{-1}$
Water flow: 2.8 $liters.h^{-1}$
Gas spatial velocity:
  actual: 510 $h^{-1}$
  at standard conditions: 1100 $h^{-1}$
Gas linear velocity: 0.06 $m.s^{-1}$
Water spatial velocity: 0.85 $h^{-1}$ After 30 days of continuous operation, the following results, shown in vpm, are obtained:

|  | inlet | outlet |
|---|---|---|
| $NO_x$ | 1600 | 745 |
| where |  |  |
| NO | 560 | 695 |
| $NO_2$ | 1040 | 50 |
| $\tau = \dfrac{NO_2}{NO_x}$ | 0.650 | 0.067 |

Abatement efficiencies:
for $NO_2$: 95.2%
for $NO_x$: 53.4%

These good efficiencies are only due to the high value of the oxidation factor of inlet gases, because during this test the flow of sprayed water was too high; it prevented the oxidation of nitric oxide NO and limited the overall abatement efficiency in $NO_x$ as will be shown in the next two cases where sprayed water flow was changed.

EXAMPLES 5a AND 5b

These two cases show how important is the sprayed liquid spatial velocity on abatement efficiency. Both tests are made in the same operating conditions:
Cocurrent flow downwards
Pressure: 2.4 bars abs
Temperature: 15° C.
Gas spatial velocity:
  actual: 450 $h^{-1}$
  at standard conditions: 1015 $h^{-1}$
Gas linear velocity: 0.055 $m.s^{-1}$
Oxidation factor: $\tau = NO_2/NO_x = 0.523$ (a) with a flow of sprayed liquid of 2.8 $liter.h^{-1}$ or a liquid spatial velocity of 0.85 $h^{-1}$, efficiencies are:
for $NO_2$: 93.0%
for $NO_x$: 51.4%

(b) with a flow of sprayed liquid of 1.2 $liter.h^{-1}$ or a spatial velocity of 0.36 $h^{-1}$, efficiencies are:
for $NO_2$: 93.6%
for $NO_x$: 56.9%

Efficiencies and more specifically the efficiency in $NO_x$ are larger with the lower liquid spatial velocity.

Other tests confirm the preferable limits for the spatial velocity of sprayed water: it varies from 0.3 to 0.4 $h^{-1}$ but efficiencies are acceptable between 0.2 $h^{-1}$ and 0.9 $h^{-1}$.

EXAMPLE 6

This case shows the influence of gas spatial velocity, therefore of contact time between the nitrous gases and the activated carbon on the abatement efficiency.
Operating conditions are:
Cocurrent flow downwards
Pressure: 2.5 bars abs
Temperature: 12° C.
Gas flow: 2.180 $Nm^3.h^{-1}$
Water flow: 1.20 $liter.h^{-1}$
Gas spatial velocity:
  actual: 280 $h^{-1}$
  at standard conditions: 660 $h^{-1}$ After 14 days of continuous operation, the following results in vpm are obtained:

|  | inlet | outlet |
|---|---|---|
| $NO_x$ | 1820 | 750 |
| where |  |  |
| NO | 890 | 700 |
| $NO_2$ | 930 | 50 |
| $\tau = \dfrac{NO_2}{NO_x}$ | 0.511 | 0.067 |

Abatement efficiencies:
for $NO_2$: 94.6%
for $NO_x$: 58.8%

Results of examples 1 through 6 are summarized in the table herebelow:

| Ex. No. | $NO_x$ vpm inlet | Oxidation factor $\tau = \dfrac{NO_2}{NO_x}$ | Gas spatial velocity actual $h^{-1}$ | Gas spatial velocity at standard conditions $h^{-1}$ | Liquid spatial velocity $h^{-1}$ | Abatement efficiency % for $NO_2$ | Abatement efficiency % for $NO_x$ |
|---|---|---|---|---|---|---|---|
| 1 | 1760 | 0.460 | 670 | 1500 | 0.21 | 89.5 | 42.6 |
| 2 | 1220 | 0.459 | 520 | 1180 | 0.36 | 91.1 | 54.9 |
| 3 | 1410 | 0.560 | 505 | 1175 | 0.36 | 80.4 | 50.0 |
| 4 | 1600 | 0.650 | 510 | 1100 | 0.85 | 95.2 | 53.4 |
| 5a | 1215 | 0.523 | 450 | 1015 | 0.85 | 93.0 | 51.4 |
| 5b | 1215 | 0.523 | 450 | 1015 | 0.36 | 93.6 | 56.9 |
| 6 | 1820 | 0.511 | 280 | 660 | 0.36 | 94.6 | 58.8 |

It can be observed that abatement efficiencies are improved by a reduction of the gas spatial velocity and by an optimized flow of sprayed water equal to approximately a spatial velocity of 0.35 $h^{-1}$.

EXAMPLE 7

The process was operated in an industrial nitric acid unit for more than 10 weeks.

The flow of nitrous gases equal to 9700 $Nm^3.h^{-1}$ containing approximately 1500 vpm of $NO_x$ at 2.7 bars abs is treated on 8.6 $m^3$ of "ACTICARBONE AC 35" activated carbon sprayed with 4 to 5 $m^3.h^{-1}$ of acidified water. Gas and liquid flow at cocurrent through the layer of activated carbon downwards.

For a normal operation of the unit (which produces nitric acid at 54% in weight), 45 to 50 vpm of nitrogen dioxide $NO_2$ are released along with 700 vpm of nitric oxide NO. Gaseous effluent is perfectly colourless and there is not significant oxidation of the released NO in the plant neighbourhood.

It was possible to produce an acid at 63% in weight with colourless effluent. This was impossible to achieve without the process for nitrous gases abatement.

EXAMPLE 8

This test was conducted at high pressure in an equipment containing 21.8 $dm^3$ of "ACTICARBONE AC 35" weighing 9.6 kg.
Operating conditions are as follows:
Cocurrent flow downwards
Pressure: 10.1 bars abs
Temperature: 9° C.
Gas flow: 47.805 $Nm^3.h^{-1}$
Water flow: 6.5 $liter.h^{-1}$
Gas spatial velocity:
  actual: 227 $h^{-1}$
  at standard conditions: 2195 $h^{-1}$
Linear gas velocity: 0.046 $m.s^{-1}$
Water spatial velocity: 0.3 $h^{-1}$ The following results in vpm are obtained:

|  | inlet | outlet |
|---|---|---|
| $NO_x$ where | 850 | 345 |
| NO | 280 | 285 |
| $NO_2$ | 570 | 60 |
| $\tau = \dfrac{NO_2}{NO_x}$ | 0.671 | 0.171 |

Abatement efficiencies:
for $NO_2$: 89.5%
for $NO_x$: 59.4%

Other tests made with lower gas spatial velocities approximately $110^{-1}$ actual (or $1025\ h^{-1}$ at standard conditions) showed that abatement efficiencies in $NO_x$ of 70% could be achieved and off-gases contained 45 vpm of $NO_2$ only. Such spatial velocities are rather low and would result in large volumes of adsorbent.

EXAMPLE 9

Pilot plant test in high pressure equipment as previously.

Operating conditions are:
Cocurrent flow downward
Pressure: 8 bars abs
Temperature: 8° C.
Gas flow: $42.820\ Nm^3.h^{-1}$
Water flow: $6.0\ liters.h^{-1}$
Gas spatial velocity:
  actual: $256\ h^{-1}$
  at standard conditions: $1965\ h^{-1}$
Gas linear velocity $0.052\ m.s^{-1}$
Water spatial velocity: $0.275\ h^{-1}$ The following results in vpm are obtained:

|  | inlet | outlet |
|---|---|---|
| $NO_x$ where | 1040 | 545 |
| NO | 430 | 487 |
| $NO_2$ | 610 | 58 |
| $\tau = \dfrac{NO_2}{NO_x}$ | 0.587 | 0.106 |

Abatement efficiencies:
for $NO_2$: 90.5%
for $NO_x$: 47.6%

These various tests at cocurrent or countercurrent or cross flow yielded best results if the operating conditions which do not limit the scope of the invention are as indicated herebelow:
Absolute pressure: 0.9 to 12 bars
Temperature: 2° to 80° C.
Liquid spatial velocity: 0.05 to $2\ h^{-1}$
Actual gas spatial velocity: 100 to $3500\ h^{-1}$ In all cases, the effluent still contains some nitric oxides NO which can be oxidized in a vessel located downstream the bed of activated carbon which yields a gas containing less nitric oxide and more nitrogen dioxide. This gas can be processed on a second bed of activated carbon; one can also design more than two activated carbon absorbers, an oxidation vessel being located between two absorbers.

The above described process in case of nitric acid units is also applicable to all cases where nitrogen dioxide $NO_2$ must be stripped for instance in units making calcium nitrates or nitrated organic substances.

It is also applicable to the concentration of dilute nitric acid; in this case the nitric acid solution is used as spraying liquid. This new process thus allows the perfect discoloration of gaseous effluent from nitric acid units, substantially reducing the release of $NO_x$ to the atmosphere and increasing the overall efficiency of the unit.

We claim:

1. A process for the continuous recovery of nitrogen oxides from atmospheric off-gases called nitrous gases containing between about 500 to 5000 vpm nitrogen oxides which comprises the steps of:
  (a) simultaneously passing said gas and water over activated carbon adsorbent in a co-current, countercurrent or cross-flow relationship at a gas spatial velocity between about 100 to $3500h^{-1}$ and a liquid spatial velocity between about 0.05 to $2h^{-1}$ and under conditions of pressure between about 0.9 to 12 bars (abs) and temperature between about 2° to 80° C.;
  (b) recovering a colorless gaseous effluent having reduced nitrogen oxide content; and
  (c) recovering the aqueous nitric acid solution.

2. The process of claim 1 wherein the nitrogen oxide containing gas contains between about 1 to 6% in volume of oxygen.

3. The process of claim 1 wherein at least a part of the recovered aqueous solution is recycled.

4. The process of claim 1 wherein the adsorbent comprises at least two beds connected in series, whereby nitric oxide (NO) leaving one bed is at least partially oxidized to nitrogen dioxide ($NO_2$).

5. A process for the continuous recovery of nitrogen oxides from atmospheric off-gases called nitrous gases containing between about 500 to 5000 vpm nitrogen oxides which comprises the steps of:
  (a) simultaneously passing said gas and aqueous nitric acid over activated carbon adsorbent in a co-current, countercurrent or cross-flow relationship at a gas spatial velocity between about 100 to $3500h^{-1}$ and a liquid spatial velocity between about 0.05 to $2h^{-1}$ and under conditions of pressure between about 0.9 to 12 bars (abs) and temperature between about 2° to 80° C.;
  (b) recovering a colorless gaseous effluent having reduced nitrogen oxide content; and
  (c) recovering the enriched aqueous nitric acid solution.

6. The process of claim 5 wherein the nitrogen oxide containing gases are tail gases from a nitric acid plant.

7. The process of claim 5 wherein the nitrogen oxide containing gas contains between about 1 to 6% in volume of oxygen.

8. The process of claim 5 wherein at least a part of the recovered aqueous solution is recycled.

9. The process of claim 5 wherein the adsorbent comprises at least two beds connected in series, whereby nitric oxide (NO) leaving one bed is at least partially oxidized to nitrogen dioxide ($NO_2$).

10. A process for the continuous recovery of nitrogen oxides from atmospheric off-gases called nitrous gases containing between about 500 to 5000 vpm nitrogen oxides which comprises the steps of:
  (a) simultaneously passing said gas and water in a cocurrent flow over activated carbon adsorbent at a gas spatial velocity between about 100 to 3500h$^{-1}$ and a liquid spatial velocity between about 0.05 to 2h$^{-1}$ and under conditions of pressure between about 0.9 to 12 bars (abs) and temperature between about 2° to 80° C.;

(b) recovering a colorless gaseous effluent having reduced nitrogen oxide content; and (c) recovering the aqueous nitric acid solution.

11. A process for the continuous recovery of nitrogen oxides from atmospheric off-gases called nitrous gases containing between about 500 to 5000 vpm nitrogen oxides which comprises the steps of:

(a) simultaneously passing said gas and aqueous nitric acid in a co-current flow over activated carbon adsorbent at a gas spatial velocity between about 100 to 3500h$^{-1}$ and a liquid spatial velocity between about 0.05 to 2h$^{-1}$ and under conditions of pressure between about 0.9 to 12 bars (abs) and temperature between about 2° to 80° C.;

(b) recovering a colorless gaseous effluent having reduced nitrogen oxide content; and (c) recovering the enriched aqueous nitric acid solution.

* * * * *